US011048786B2

(12) United States Patent
Apostolos et al.

(10) Patent No.: US 11,048,786 B2
(45) Date of Patent: Jun. 29, 2021

(54) TECHNIQUES FOR FINGERPRINT DETECTION AND USER AUTHENTICATION

(71) Applicant: AMI Research & Development, LLC, Merrimack, NH (US)

(72) Inventors: John T. Apostolos, Lyndeborough, NH (US); William Mouyos, Windham, NH (US); James D. Logan, Candia, NH (US)

(73) Assignee: AMI Research & Development, LLC, Merrimack, NH (US)

( * ) Notice: Subject to any disclaimer, the term of this patent is extended or adjusted under 35 U.S.C. 154(b) by 0 days.

(21) Appl. No.: 16/595,017

(22) Filed: Oct. 7, 2019

(65) Prior Publication Data

US 2020/0117783 A1    Apr. 16, 2020

Related U.S. Application Data

(63) Continuation-in-part of application No. 15/486,527, filed on Apr. 13, 2017, now Pat. No. 10,438,041.

(60) Provisional application No. 62/321,967, filed on Apr. 13, 2016.

(51) Int. Cl.
   *G06F 21/32*    (2013.01)
   *G06F 3/047*    (2006.01)
   *G06F 3/044*    (2006.01)

(52) U.S. Cl.
   CPC .............. *G06F 21/32* (2013.01); *G06F 3/044* (2013.01); *G06F 3/047* (2013.01)

(58) Field of Classification Search
   CPC .................................................... G06F 3/044
   See application file for complete search history.

(56) References Cited

U.S. PATENT DOCUMENTS

| 6,201,504 | B1 | 3/2001 | Aminzadeh et al. |
| 6,498,588 | B1 | 12/2002 | Callaghan |
| 6,574,460 | B1 | 6/2003 | Lindenmeier et al. |
| 8,368,316 | B2 | 2/2013 | Yinn et al. |
| 8,508,244 | B2 | 8/2013 | Seguine |
| 8,723,825 | B2 | 5/2014 | Wright et al. |
| 10,361,802 | B1* | 7/2019 | Hoffberg-Borghesani .................. G11B 27/11 |
| 2005/0195114 | A1 | 9/2005 | Yegin et al. |
| 2011/0261191 | A1* | 10/2011 | Byren ...................... G01S 17/14 348/135 |
| 2012/0050216 | A1 | 3/2012 | Kremlin et al. |
| 2012/0268332 | A1 | 10/2012 | Guan et al. |
| 2013/0222331 | A1 | 8/2013 | Kyrynyuk et al. |
| 2013/0272586 | A1* | 10/2013 | Russo ..................... G06F 21/82 382/124 |
| 2014/0035859 | A1 | 2/2014 | Wilson et al. |
| 2014/0285469 | A1 | 9/2014 | Wright et al. |

(Continued)

FOREIGN PATENT DOCUMENTS

DE    19535250 B4    7/2006

OTHER PUBLICATIONS

A. Libert. "A 1D Spectral Image Validation/Verification Metric for Fingerpints" NISTIR 7599, Aug. 2009. (Year: 2009).*

(Continued)

*Primary Examiner* — Oneal R Mistry
(74) *Attorney, Agent, or Firm* — David J. Thibodeau, Jr.; VLP Law Group LLP

(57) ABSTRACT

We present several unique techniques for using touch sensor arrays to detect fingerprint information and authenticate a user.

9 Claims, 13 Drawing Sheets

(56) References Cited

U.S. PATENT DOCUMENTS

| | | | |
|---|---|---|---|
| 2014/0359757 A1* | 12/2014 | Sezan | G06K 9/0002 726/19 |
| 2015/0015537 A1 | 1/2015 | Riedijk et al. | |
| 2015/0070301 A1 | 3/2015 | Chia et al. | |
| 2015/0198699 A1 | 7/2015 | Kuo et al. | |
| 2016/0217314 A1 | 7/2016 | Kim | |
| 2016/0232401 A1 | 8/2016 | Hoyos et al. | |
| 2017/0032169 A1* | 2/2017 | Pi | G06K 9/00906 |

OTHER PUBLICATIONS

International Search Report and Written Opinion of the International Searching Authority, PCT/US2017/065684, dated Mar. 23, 2018.

* cited by examiner

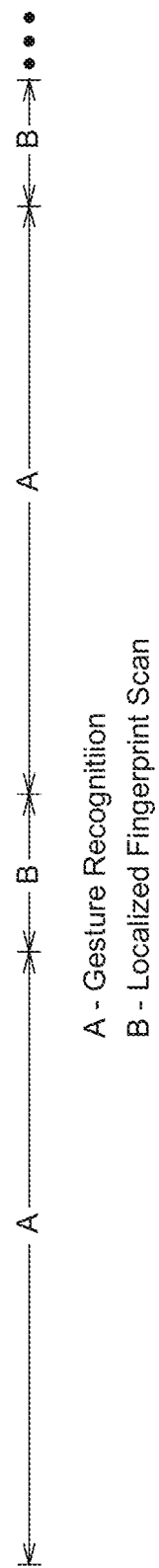
FIG. 3-1
A - Gesture Recognition
B - Localized Fingerprint Scan
FIG. 3-2

Single Tap Plus Centroid/Match Against Manifold
Series of Taps/Centroids/Match Against Manifold

TECHNIQUES FOR FINGERPRINT DETECTION AND USER AUTHENTICATION

CROSS REFERENCE TO RELATED APPLICATIONS

This patent application claims priority to U.S. Provisional Patent Application Ser. No. 62/321,967, which was filed on Apr. 13, 2016, by John T. Apostolos et al., for TECHNIQUES FOR FINGERPRINT DETECTION AND USER AUTHENTICATION, and U.S. Non-Provisional patent application Ser. No. 15/486,527, which was filed on Apr. 13, 2017, by John T. Apostolos et al., for TECHNIQUES FOR FINGERPRINT DETECTION AND USER AUTHENTICATION, the entire contents of which are hereby incorporated by reference.

TECHNICAL FIELD

This patent application relates to touchscreens and more particularly to techniques for detecting fingerprints and user authentication.

BACKGROUND

Computers, smartphones, tablets, vehicle systems, vending machines, and small appliances are just examples of the types of devices which now incorporate touchscreens. Widespread adoption of these devices brings with it an increasing need for security and prevention of unauthorized use.

Recent developments have enhanced the ability to recognize authorized users based on biometric authentication modalities. One approach detects a representation of a user's finger using the same touch sensor array typically used for detecting finger centroid position in smartphone or tablet computer. Because this approach uses the existing touchscreen sensor array, the mechanism for recognizing a fingerprint of an authorized user does not require retrofitting additional hardware or new types of sensors.

A typical touchscreen uses a projected capacitive grid structure where every electrode intersection can unambiguously be identified as a touch point or "cell". As the user's finger slides up and down along the grid, the ridges and valleys of the finger also move across a small subset of these touch points. This movement of the finger superimposes a time-varying signal on the outputs of the grid, where amplitude over time is representative of the fingerprint "terrain". See for example, U.S. Patent Publication 2014/0310804 A1 entitled "Fingerprint Based Smartphone User Verification" incorporated by reference herein for more details.

SUMMARY

We present several unique techniques for using touch sensor arrays to detect fingerprints and authenticate a user. Among these techniques include methods and systems for detecting a fingerprint via localized, higher rate sampling of a touchscreen adjacent the detected location of a user's finger;

representing a fingerprint by prompting a user to swipe a finger along two or more paths on a sparse 2D touch array, detecting two or more one-dimensional (1D) time varying signal representative of ridge and valley detail from the sparse touch array for each swipe, and fusing the two or more 1D signals together;

authenticating a user of a second device having a sparse 1D touch sensor by detecting fingerprint information from the second device and forwarding the data for matching to a cloud processor or back to a first device with the sparse 2D touch array;

authenticating a user by prompting them to swipe a finger along a touch sensor array to obtain enrollment data;

representing a fingerprint by dividing fingerprint data into two or more sets of overlapping rectangular sub-templates; and determining if a user is authenticated by detecting fingerprint data while the user swipes a finger along a slide-to-unlock prompt.

In one implementation, detailed fingerprint information is obtained by operating a touch sensitive array in two modes. In a first mode, touch sensitive elements of the array to are scanned at a first rate to provide outputs sufficient to detect a position of the finger. In a second mode, the touch sensitive elements of the array are scanned at a second rate higher than the first rate. The second mode provides outputs from the array comprising a time-varying sequence of digital amplitude values that, over time, are representative of a ridge and valley detail of a rectangular portion of the fingerprint that passes adjacent the corresponding one of the touchscreen array elements as the person uses the touchscreen. By periodically switching between the first mode and the second mode, the position of the finger detected in first mode can be used to determine when to switch to the second mode.

The ouputs obtained in the first mode can be used to determine one or more gestures from one or more fingers.

Kalman filtering can be used on the outputs of the array provided in the first to determine a likely position of the finger on subsequent scans.

The array may be a capacitive array comprising a set of parallel transmit electrodes located along a first axis in a first plane, and a set of parallel receive electrodes located along a second axis in a second plane, with the elements located adjacent where the transmit and receive electrodes cross.

The array may be a sparse array where a spacing between adjacent elements of the array is at least ten times greater than a ridge and valley spacing of the person's fingerprint.

The outputs of the array obtained in the second mode may be matched against templates to authenticate the user. In some implementaitons, the templates may each be two or more overlapping rectangular sub-templates. The sub-templates can be rotated independently of one another to improve the matching process.

BRIEF DESCRIPTION OF THE DRAWINGS

FIGS. 2-1, 2-2, 2-3 and 2-4 illustrate a touch sensitive grid, a particular crosspoint, and the resulting signal produced by a ridge-valley detector as the finger moves past one of the crosspoints in the array.

FIGS. 3-1 and 3-2 illustrate switching between a first and second scanning mode.

FIG. 4 illustrates an enrollment phase.

DETAILED DESCRIPTION OF VARIOUS EMBODIMENTS

Example System

Figure 1:
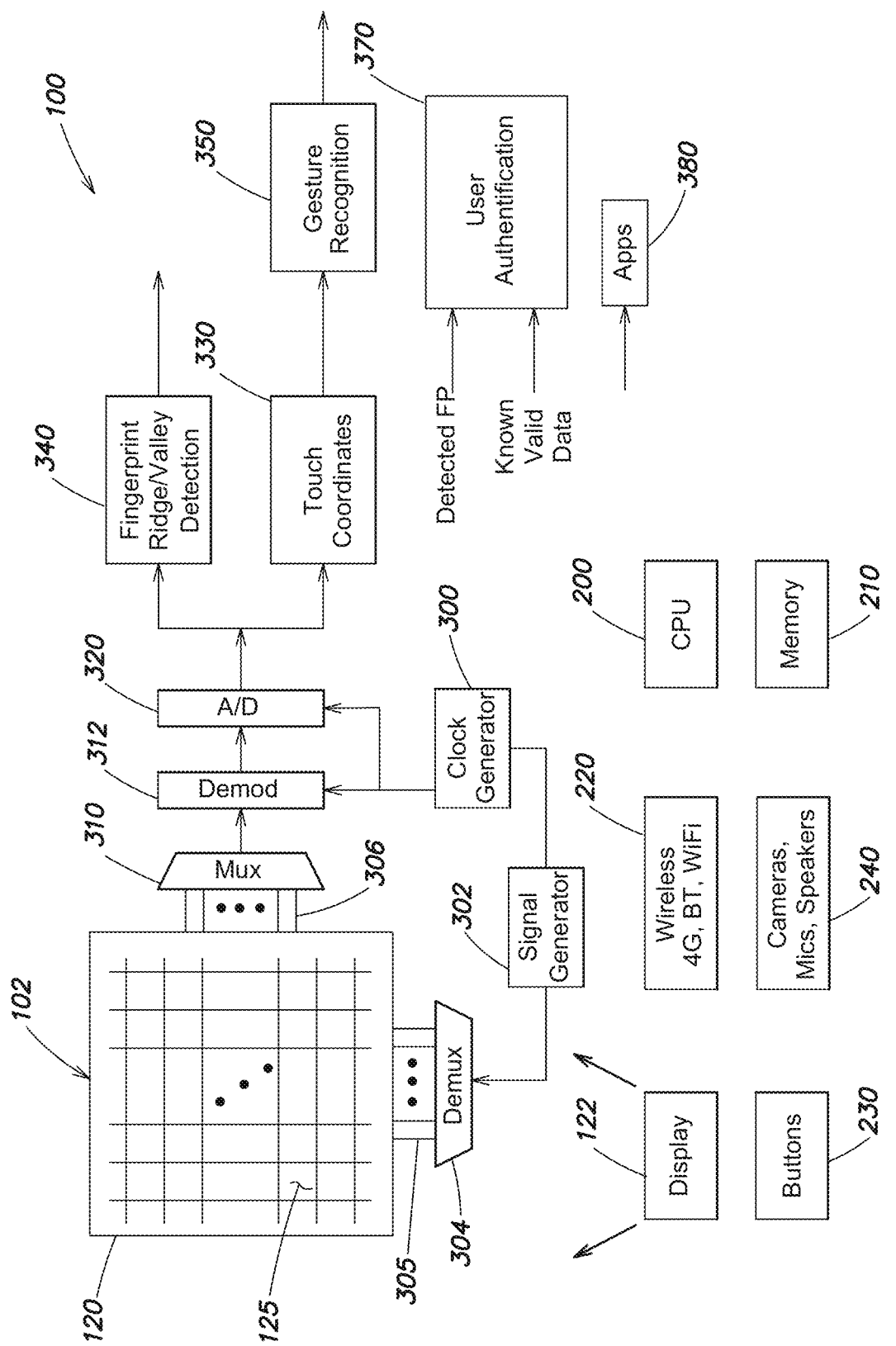
FIG. 1 is a block diagram of a representative electronic system.

FIG. 1 is a block diagram of a representative electronic system 100 which may implement the techniques described herein. The system 100 may be a smartphone, tablet, personal computer, automobile dashboard, vending machine, small appliance, hand-held device, or some other system that has a touch sensitive surface 102 that includes a touch array 120. It is now common for the touch array 120 to be an integral part of a display assembly 122. Other components of the system 100 may include a central processing unit 200, memory 210, one or more wireless interfaces 220, other input devices such as buttons 220, and other peripheral devices such as cameras, microphones, speakers and the like 240.

Of particular interest to the present discussion is that when a person interacts with the sytem 100, the sensor array 120 detect touches of the person's finger on or near the surface 102. In the illustrated embodiment, the sensor array includes elements 125 that are disposed as a two-dimensional matrix. Each sensor element 125 (also referred to as a "crosspoint" or "cell" herein) may be implemented as a capacitive sensor. It should also be understood that the sensor array 120 may not be an actual wire grid but may include capacitive pads that overlap in a diamond pattern, a totem-pole pattern, or other geometric patterns of overlaid conductive elements. What is important is that the array 120 provide a set of intersections or crosspoints arranged along an X and Y axis as a logical grid.

Although not shown in detail, there are numerous known methods for converting the outputs of a capacitive sensor array into a detectable signal, including sensing current versus voltage, phase shifts, resistor-capacitor charge timing, capacitor bridge dividers, charge transfer, successive approximation, sigma-delta modulators, charge accumulation circuits, field-effect, mutual capacitance, frequency shift, many other techniques. The particular method for detecting the relative change in capacitance due to the proximity of a user's finger is not material to the present invention. More details of an example touch sensor array 120 can be found in US Patent Publication US 2013/0222331 assigned to Cypress Semiconductor.

Other circuits in the system 100 may include a clock generator 300, signal generator 302, demultiplexer 304, multiplexer 310, demodulator 312, analog-to-digital converter 320. The clock generator 300, signal generator 302, demux 304 and mux 310 are controlled by the CPU 200 or other controller to scan the outputs of each individual capacitive element 125 of the touch array 120 in a regular repeating pattern. Processing logic may include touch coordinate determination 330, fingerprint ridge-valley detection 340, gesture recognition 350 and other signal processesing implemented in hardware or software. The processing logic may provide additional outputs to functions such as user authentication 370 or software applications 380 executed by the CPU 200.

The processing logic uses outputs from the touch array 120 in various ways. For example, the touch coordinate 330 signal processing may identify one or more local maxima in the output of the array 120 signals provided by provides information representing the X-Y coordinates of one or more centroids of the user's finger. The centroid data may then be further processed over time by gesture recognition 350 and other applications 380.

As explained in the Cypress Semiconductor patent publication referenced above, when an object such as a finger approaches the touch array 120, the object causes a decrease in the mutual capacitance between only some of the electrodes in the array 120. For example, when a finger is placed near or on the intersection 125, the presence of the finger will decrease the charge coupling between only a few of the nearby electrodes. Thus the, location of the finger on the touchpad can be determined by identifying the one or more electrodes having a decrease in measured mutual capacitance.

The specific cross point can be identified by noting the particular transmit electrode to which the a signal was applied by the demultiplexer 304 at the time the decrease in capacitance was measured through the multiplexer 310 (demodulator 312) and analog-to-digital converter converter 320. In this way, the precise locations of one or more conductive objects such as one or more finger centroids may be determined.

More particularly, the output of signal generator 302 is connected with demultiplexer 304, which allows one or more transmit (TX) signals to be applied to any of the M transmit electrodes 305 of touch array 120. In one embodiment, demultiplexer 304 is controlled so that a TX signal is applied to each transmit electrode 305 in a controlled sequence. Demultiplexer 304 may also be used to ground, float, or connect an alternate signal to the other transmit electrodes to which the TX signal is not currently being applied.

is Because of the capacitive coupling between the transmit TX and receive RX electrodes 306, the TX signal applied to each transmit electrode 305 induces a current within each of several receive electrodes 306. The RX signal on each of the receive electrodes 306 can then be measured in sequence by using multiplexer 310 to connect each of the N receive electrodes to demodulation circuit 312 in sequence.

The mutual capacitance associated with each intersection between a TX electrode 305 and an RX electrode 306 is sensed by selecting every available combination of TX electrode and an RX electrode using demultiplexer 304 and multiplexer 310. To improve performance, multiplexer 310 may also be segmented to allow more than one of the receive electrodes in matrix to be routed to additional demodulation circuits.

When an object, such as a finger, approaches the touch array 120, the object causes a decrease in the measured mutual capacitance between only some of the electrodes. For example, if a finger is placed near the crosspoint 125 of a given one of the transmit electrodes 305 and receive electrodes 306, the presence of the finger will decrease the charge coupled between electrodes 305 and 306. Thus, the location of the finger on the touchpad can be determined by identifying the one or more receive electrodes having a decrease in measured mutual capacitance in addition to identifying the transmit electrode to which the TX signal was applied at the time the decrease in capacitance was measured on the one or more receive electrodes.

By determining the mutual capacitances associated with each intersection of electrodes in the touch array 102, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The ridge and valley detail of the user's fingerprint may optionally be detected by processing the output of the A/D converter 320 over time. In particular, as a user's finger moves up, down, left, and/or right past a particular grid crosspoint 125, the output of the A/D 320 is a signal representative of the ridge and valley detail of the user's fingerprint.

According to other aspects of the present discussion, the ridge and valley detail of the user's fingerprint is also detected by processing the output of the A/D converter 320 over time. In particular, as a user's finger moves up, down, left, and/or right past a particular grid crosspoint 125, the output of the A/D 320 is a signal representative of the ridge and valley detail of the user's fingerprint.

Figures 1, 2:
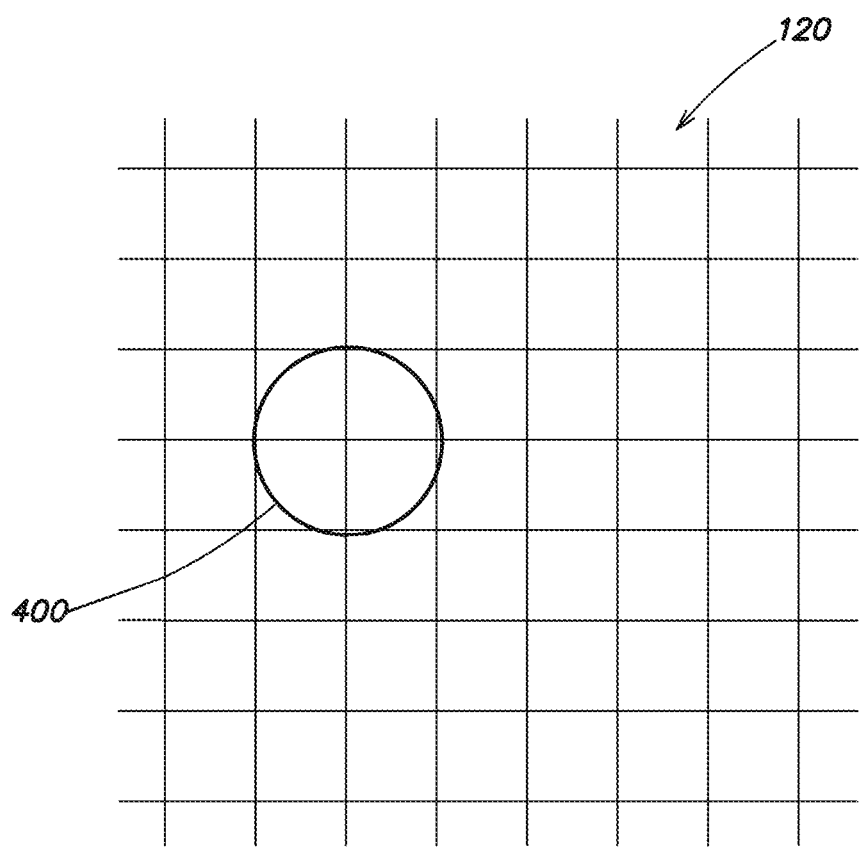
Figure 2:
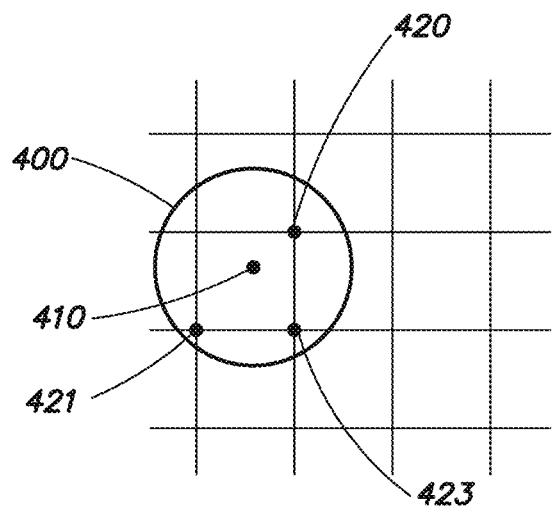

This is true even though the grid is relatively sparse as compared to the spacing between the ridges and valleys of a typical fingerprint. FIG. 2-1 shows a sample grid 120 and adjacent fingertip 400. The spacing between the sparse grid intersection points may be 0.25 inches, whereas a typical ridge and valley spacing is much smaller, on the order of 0.5 mm.

Figures 2, 3, 4:
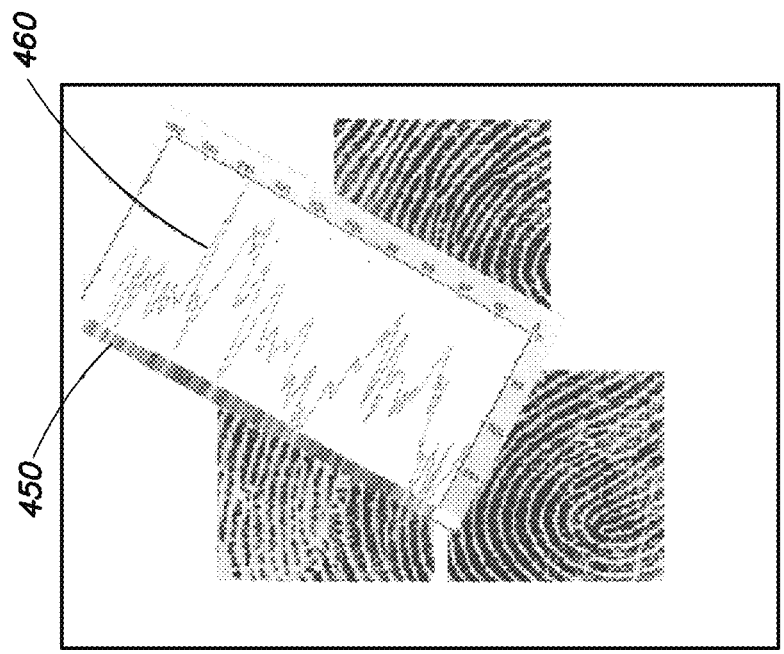
Figures 2, 3:
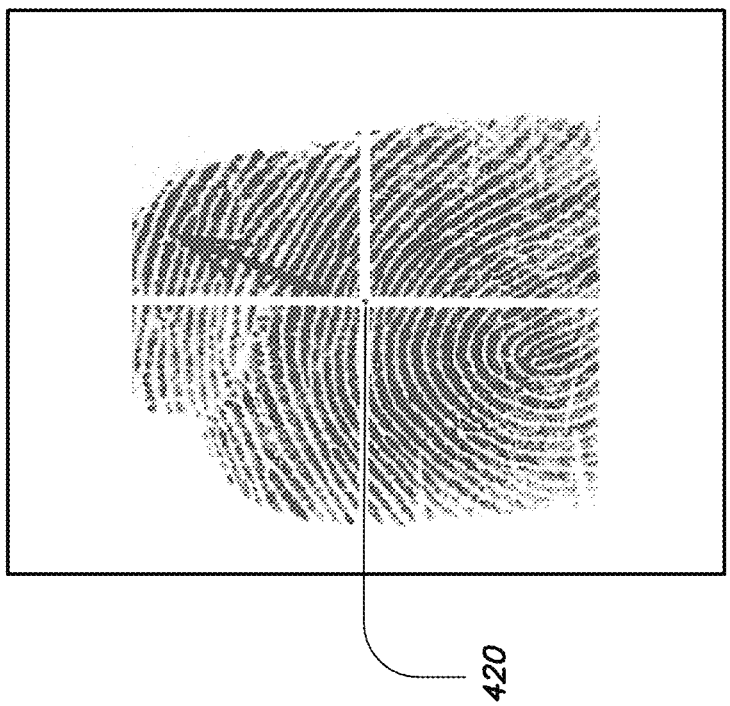
Figure 4:
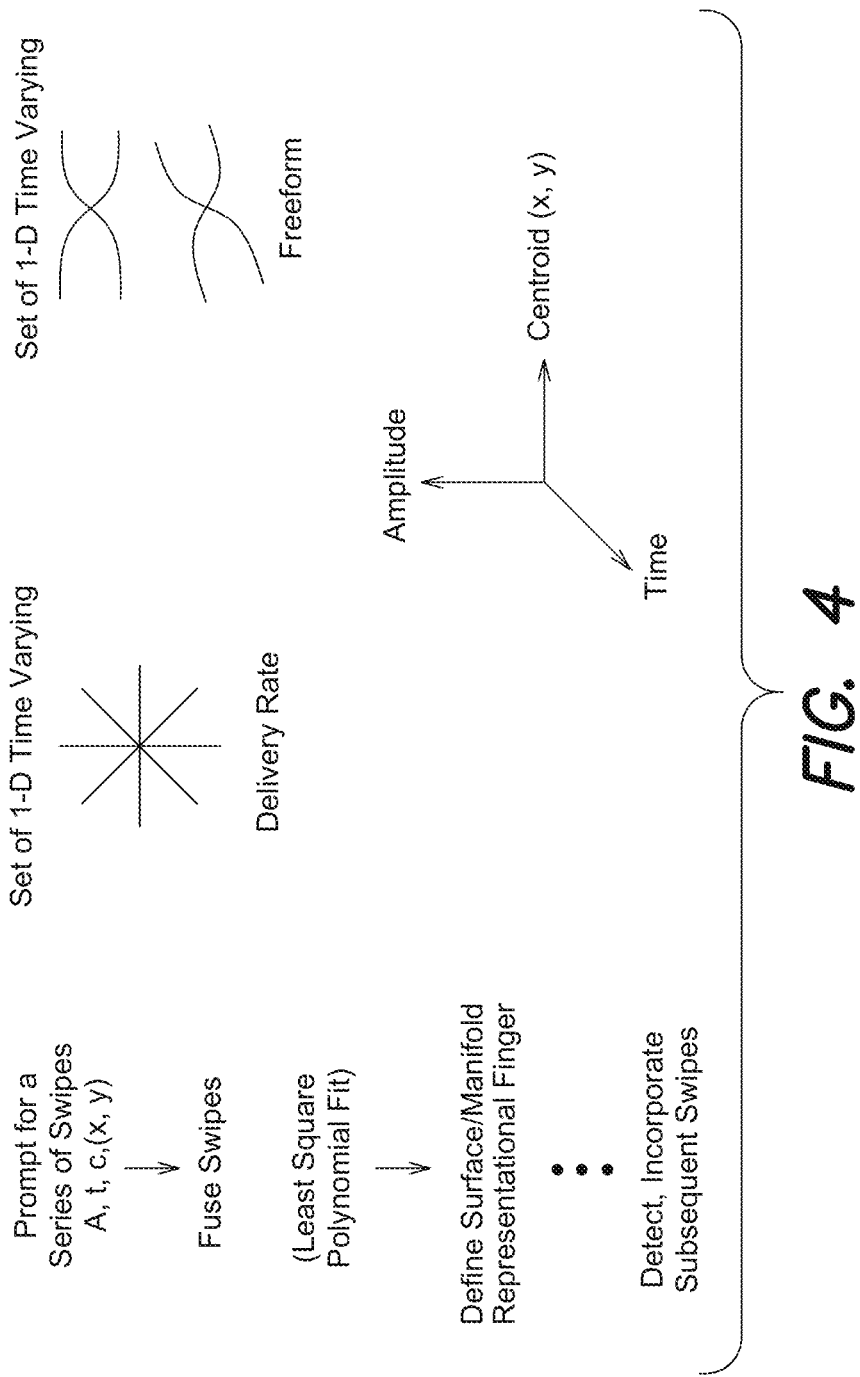

FIG. 2-2 shows this situation in more detail where a particular crosspoint 420 of the grid is identified as being closest to the centroid 410 of the fingertip 400. As shown in FIG. 2-3, as the finger moves past the crosspoint 420 (e.g., in the direction of the arrow up and to the right) a signal such as that shown in FIG. 2-4 is produced by the ridge-valey detector 340 as different capacitance values are presented at different instances in time, is depending upon whether a ridge or a valley is immediately adjacent the crosspoint 420. The signal is a sequence of grayscale values as shown in the strip 450; the signal can also be thought of as a one-dimensional time varying signal 460 where amplitude represents changes in the detected ridge-valley depth over time.

More details for how to detect the ridge and valley detail of the fingerprint are described in U.S. Pat. No. 9,432,366 issued Aug. 30, 2016 entitled "FINGERPRINT BASED SMARTPHONE USER VERIFICATION" which is hereby incorporated by reference.

1. Location of Fast Simple Rate Crossover Points Based on Detected Finger Centroid It has been determined that in order to accurately represent the ridge-valley detail of a finger, a sample density of approximately 200 samples per inch at an eight-bit resolution is desirable. Assuming a moving finger swipes at a rate of 92 inches per second, a sample rate of approximately 14,000 eight-bit samples per second at each crosspoint shold provide the desired resolution for each 1-D time varying signal 450.

We have realized, however, rather than subject the entire grid 120 to this elevated sampling rate, in a preferred embodiment it is desirable to localize the higher sampling as close as possible to a region on the grid where the finger is already known to be. In other words, the centroid location of the finger as detected by touch coordinate 330 may be used to control the clock generator, signal generator, and A/D converter to determine at which points in time to increase the sample rate of the array.

More particularly, in a typical arrangement as shown in FIG. 1, there is a single A/D converter 320 available to sample all of the crossover points 125 in the array 120. The approach here is to operate a first mode to locate the coordinates of the finger of the using the touch coordinate processing 330 and then in a second mode adjust the clock is generator to control the A/D 320 and clock to provide a higher sample rate in an area of the grid 120 closest to where the finger is known to be located. For crossover points of the grid located away from the finger, a much slower sampling rate is adequate—as long as it is fast enough to for example sample the further possible movement of a finger centroid to another position on the grid. Thus as shown in FIG. 3-1 we time multiplex the A/D such that for a first, longer period of time (a first mode designated by the letter A) the portions of the grid located away from the last known position of the finger as sampled at a slow rate, and for a second, shorter period of time (a second mode designated by the letter B) the portions of the grid nearest the finger are sampled at least at the desired 14,000 samples per second.

In one example, the grid 120 may consist of a 21×21 array, or a total of 421 crossovre points. In a case where there is no localized high rate sample, and assuming the A/D 320 can sample at 150,000 samples per second (sps), we can at best provide a sample rate for the entire grid of:

$$\frac{150 \; ksps}{421 \; \text{crossovers}} = 356 \; \text{samples per second, per crossover}$$

Devoting 14,000 of the available 150,000 samples per second to a crossover point closest to the finger (time period B in FIG. 3-1) leaves 150,000−14,000=136,000 left over samples per second $$\frac{136,000 \; ksps}{420 \; \text{other crossovers}} =$$

323 samples per second for leftover (time period A)

It may be desirable to scan not just one, but say, the three closest crossover points is 420, 421, and 423 as shown in FIG. 2-2. FIG. 3-2 depicts the time multiplex operation in this scenario, where there may be three time slots B1, B2 and B3 devoted to sampling the three crossovers. So, if instead we decide to sample the three (3) closest crossovers to the centroid, we need to devote 3×14,000=42,000 samples per second to periods B1, B2, and B3, leaving $$\frac{150,000\text{-}42,000}{418 \; \text{other crossovers}} =$$

258 samples per second for leftover (time period A)

In applications where multi-finger gestures are possible (such as two- or three-finger swipes) it may be necessary to detect the three crossover points closest to each of the three finger locations. To sample 9 crossover points each at the desired 14 samples per second would yield a maximum sample rate of the remainder of the array at:

$$\frac{150{,}000\text{-}126{,}000}{412 \text{ other crossovers}} = 58 \text{ samples per second (time period } A)$$

The above analysis assumes that it is necessary to sample all leftover crossover points in the array. However that may not always be the case when recognizing gestures.

For example, gesture recognition 250 may only need to sample a smaller window adjacent the finger (say a 9×9 subset) of the entire 21×21 array.

2. Filtering Centroid and/or Amplitude Data

In some embodiments it may be advantageous to apply a filtering algorithm such as a Kalman filter to a series of detected finger centroid locations. This filtered information may then be used to provide a more accurate prediction of the next most likely positon of a moving finger in the middle of a swipe. Amplitude data from two or is more crossover points adjacent the current centroid may also be used to improve the estimate. This filtered information may be used to better determine where the closest crossover points are likely to be on the next scan of the array, in turn improving the ability to accurately place the higher sampling rate periods B. The Kalman filtering operation may be implemented in the touch coordinate detector 330.

3. Fingerprint Registration Process Using a Set of Multiple Swipes

Using the resulting fingerprint data for an authentication process 370 also requires obtaining a data set representing one or more authorized users. The data set is then used for matching a currently detected fingerprint against one or more enrolled fingerprints. The aforementioned techniques may also be leveraged during initial enrollment of an authorized user.

FIG. 4 shows an example enrollment phase. The process for obtaining a data set representing the enrolled, valid user may involve prompting a series of swipe inputs on the touch array 120. Each swipe results in a one-dimensional (1D) time-varying signal such signal 450 shown in FIG. 2-4. The user may provide the series of swipes by following a deliberate pattern (such as the star pattern shown in FIG. 4 or other some other predetermined pattern), or the user may be prompted make a series of freeform swipe inputs anywhere they find comfortable.

In some instances the time varying grayscale data shown in FIG. 2-4 may be maintained in the time domain signal; however in other instances this signal may be converted to a frequency domain representation to obtain phase information. It has been found that the phase information is also helpful in improving the fingerprint recognition process.

After the one-dimensional time varying signal is obtained for each finger swipe it may be desirable to not only record the amplitude versus time information as per FIG. 2-3 but also record how the corresponding X, Y finger centroid changed as the user moved their finger. The result is at least a two-dimensional set of data including time and amplitude information for a set of swipes; or multidimensional information, if the X-Y finger centroid information is also recorded.

In a next step the set of swipe data are fused to form an enrolled data set. The data fusing may use a number of techniques, such as a least square two-dimensional polynomial fit, or a sinusoidal fit. In the case of amplitude versus time swipe data, this results in a three dimensional surface that is representative of the enrolled finger. Other multidimensional curve fitting algorithms may be used when the finger swipe data includes the X-Y centroids, with the fusion resulting in a multi-dimensional manifold that is representational of the fingerprint. This fused data will not be a visual or photographic image of the fingerprint but will be representative of the fingerprint detail.

This fused data can then be used as the enrolled template against which the detected fingerprint data is matched during user authentication 370.

It should also be understood that the authentication process 370 may be a "deep" learning process that continues to improve the representational surface/manifold with each subsequently detected swipe from a user who is already known to be authorized. For example, as the user engages in other operations with the device (such as interacting with an application 380 with finger swipes on the touch array) the new fingerprint data can be detected and fused with the existing data set.

4. Single Finger Tap Self-Correlation

Figure 5:
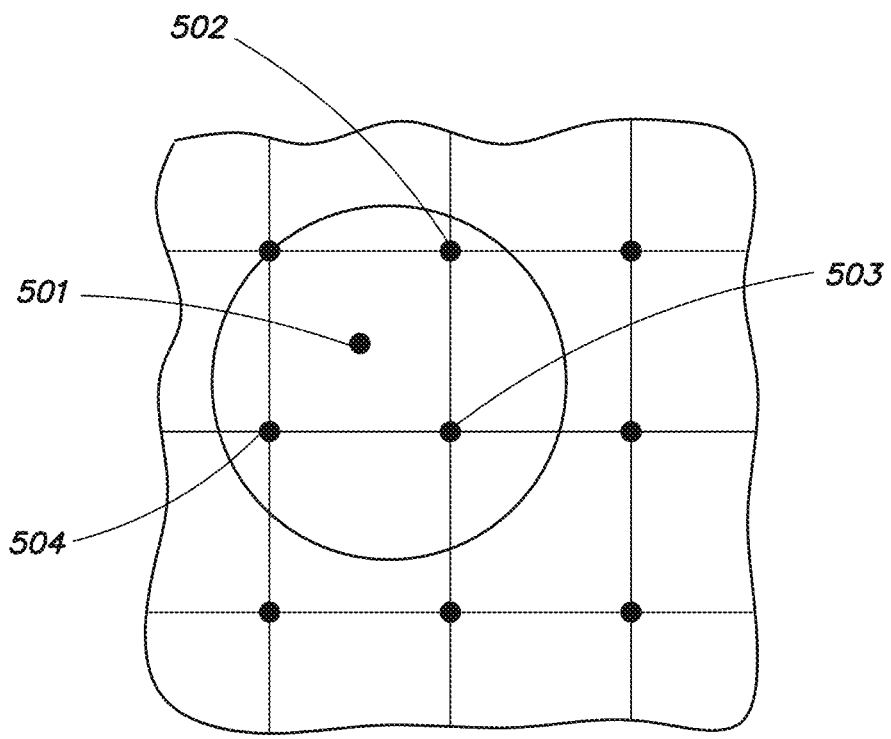
FIG. 5 illustrates a single tap fingerprint recognition mode.

It may also be possible to use a low-density sensor grid 120 without relying on finger motion to develop time-varying 1D signals. As shown in FIG. 5, a user may simply tap the touchscreen and this event is still detected at one or more crossover points 502, 503, 504 closest to a centroid 501. The three grayscale values resulting from this single tap plus the centroid X-Y information may then be used to provide at least a rough match via self-correlation against a previously enrolled data set. While detecting the 3 closest crossovers (or even the 9 closest crossovers) from a single tap is a very sparse sample of the fingerprint data, it may be sufficient to provide accurate authentication in some instances.

Self-correlating with a series of detected taps and associated centroids, collected as the user taps two or more places on the touchscreen while interacting with it, may provide further information for an improved user authentication 380.

5. Enrollment on Touchscreen; Detection on IoT Device

Figure 6:
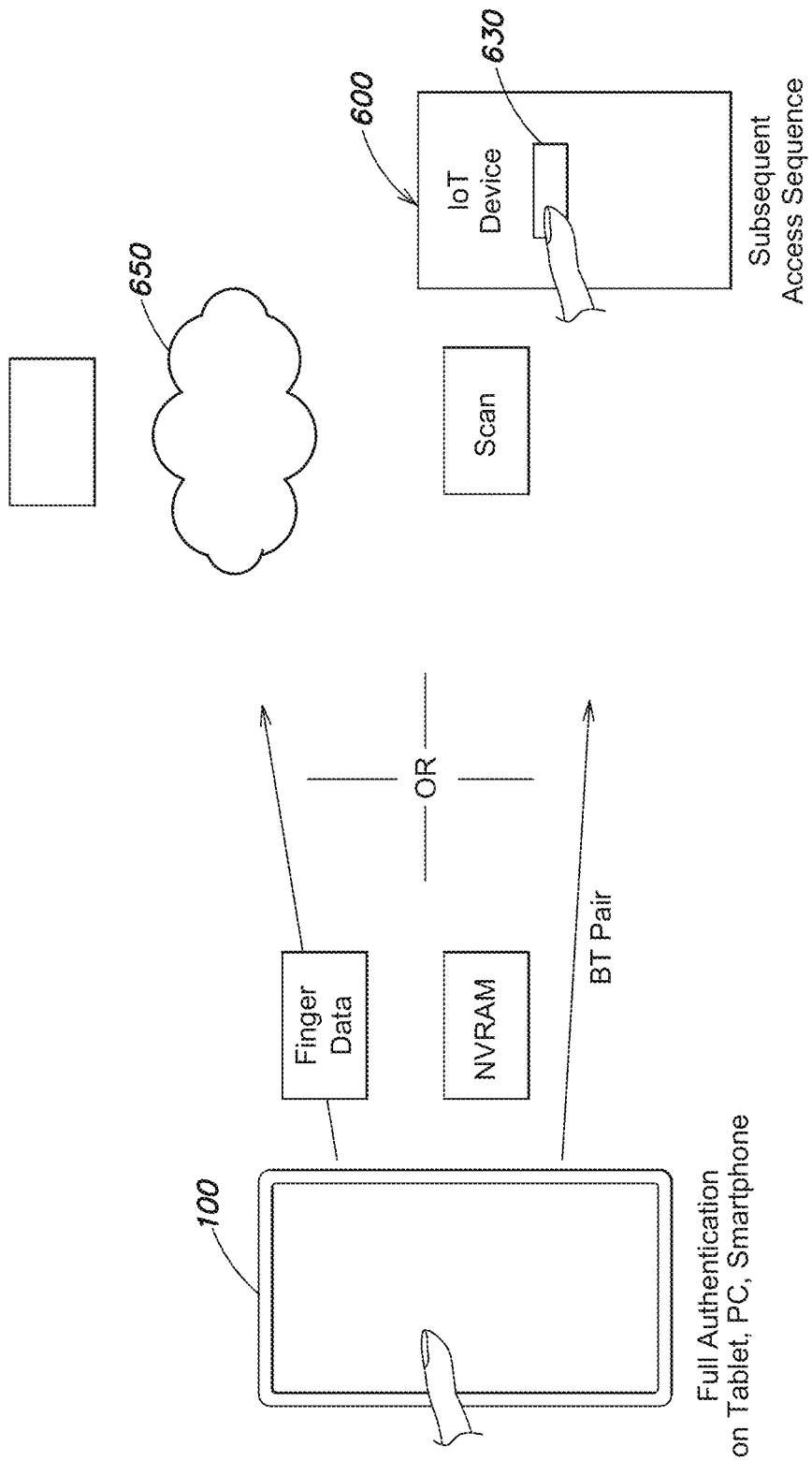
FIG. 6 shows enrollment on one device and fingerprint detection on a second device.

FIG. 6 illustrates a use case for the above fingerprint detection methods and a unique authentication process. An authorized user first enrolls their fingerprint using a touchscreen device 100 as has been described above using a tablet, smartphone, personal computer or other device which has a fully operational two-dimensional touchscreen. This full registration process results in a three-dimensional surface (taken from the set of one-dimensional time varying signals 450) or even a multidimensional manifold (with additional information such as the X-Y centroids) as been described above.

Once the user's finger data is enrolled it is then stored in a non-volatile memory in the device 100 itself or may be transmitted to cloud processor 650. This data is then subsequently made available to a simpler device 600 via a Bluetooth pairing, or other wireless connection to device 100, or via another wired or wireless connection from the simpler device 600 to the cloud processor 650.

The device 600 (which may be a so-called "Internet of Things (IoT) device") may serve a very simple function such as a light switch or a door lock. But even this simple device can benefit by ensuring that only an authorized user can manipulate it. The IoT device may only have an one-dimensional, single sparse row 630 of capacitive touch sensors spaced for example 0.25 inches apart. This low-cost sparse 1-D sensor is then used to collect at least some information from the user's finger either from a swipe of the user's finger or even a static tap. In any event, the information collected from the sensor 630 in the IoT device 600 is forwarded to either the cloud processor 650 or the device 100 for self-correlation against the enrolled fingerprint data.

In this matter, an inexpensive IoT device such as an outdoor light switch may still take advantage of the authentication processes described above to prevent unauthorized tampering.

6. Handgun use Case

Figure 7:
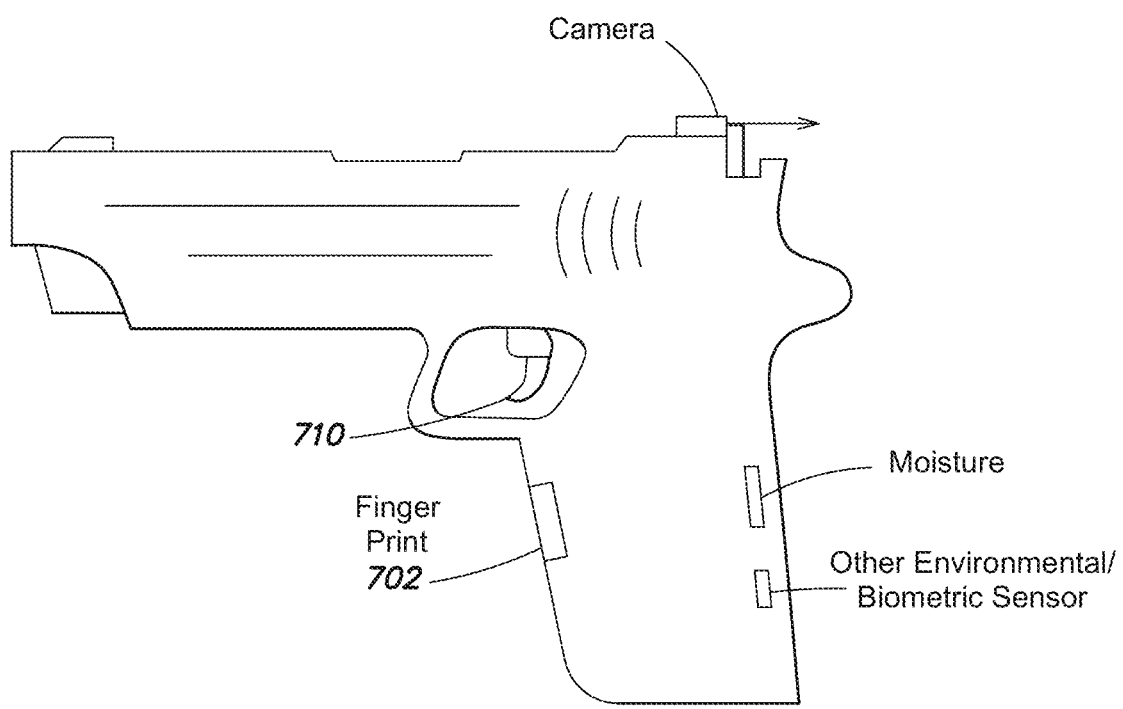
FIG. 7 is a handgun use case.

Another potential application for the processes described herein is authentication prior to enabling access to dangerous object such as a chain saw, power tool, or handgun. As shown for the handgun example in FIG. 7, the device 100 again incorporates a fingerprint sensor 702 in the trigger and/or handle. The type of device 100 may justify providing a higher density two-dimensional sensor 702 where the spacing between adjacent crosspoints is somewhat greater than the typical sparse touchscreen array 120. Fingerprint information may be matched by processing logic located within the handgun itself or by pairing the gun over a wireless link to device 100 or cloud process 650 as described in connection with FIG. 6.

Other biometric sensors such as a moisture sensor (to detect moisture on the user's palm), a heartbeat sensor, or a camera (which obtains face data, facial expression data, or iris scan information) may also be incorporated into handgun 700 and fused with data from the fingerprint sensor 702. A match against an enrolled data set by user authentication 370 may be needed in order to determine whether or not to electronically enable the trigger 710.

7. Rotating and Scaling Sectioned Templates

The techniques described herein may also use a novel approach to representing the enrolled data set. A typical prior art approach considers a fingerprint data set (whether it be a photograph (visual scan) of the fingerprint, a set of 1-D time varying swipes, or a fused surface/manifold) to be a single template of a regular array of values.

Figure 8:
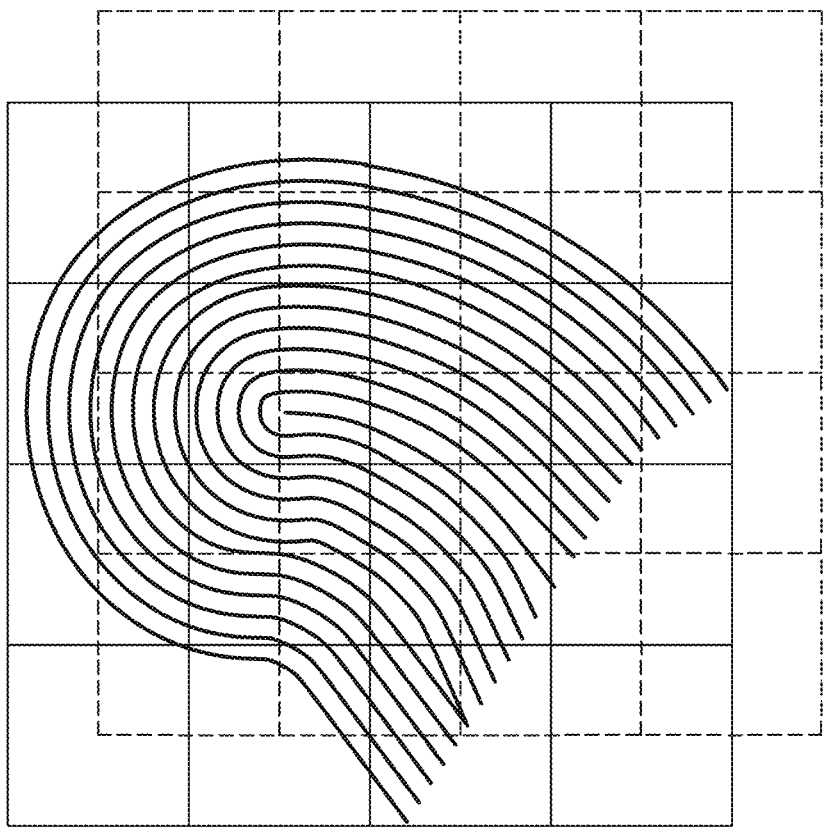
FIG. 8 illustrates overlapping sub-templates.

However, rather than use a single template for self-correlation we have found it advantageous to break up each data set for a given finger into a set of overlapping rectangular pieces or "sub-templates." In the example shown in FIG. 8, a grayscale photograph of an authorized fingerprint has been divided into 32 overlapping pieces. This template thus consists of a first set of first set of 16 templates as indicated by the solid lines, and a second set of 16 templates (which each overlap with pieces of the first set) as indicated by the dashed lines.

When performing the authentication (self-correlation) process 370 the detected fingerprint data is individually correlated against each of the 32 pieces before making a match/no-match decision.

This approach is believed to be advantageous because in a typical situation the whole fingerprint is hardly ever detectable with a touchscreen in a single swipe. Rather, it is far more common for just a finger tip region, or a side portion of the finger to touch the touchscreen while swiping.

With this approach each template or sub-template can be independently rotated during self-correlation (users also typically touch the screen with their finger in different orientations/angles or with different sides or edges of the finger from swipe to swipe).

In addition, scaling of detected data versus enrolled data can provide more accurate results (for example, a user may touch the touchpad applying different finger pressure at different times, resulting in distortion of the detected fingerprint or stteching of the skin).

8. Swipe to Unlock Use Case

In another implementation, fingerprint-based authentication may be performed using touchscreen grid during an operation such as a "slide to unlock". As shown in FIG. 9A, a slide to unlike prompt may encompass a small number of grid crossover points (for example only three or four of them). As explained above, touchscreen logic and A/D may sample each of three crossover points at approximately 14,000 samples per second (a total of 42,000 samples per second); ridge-valley fingerprint detection 340 can then detect fingerprint and match it against an enrolled data set.

Figure 9C:
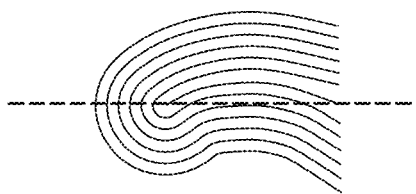
FIGS. 9A-9C are a swipe to unlock use case.
Figure 9B:
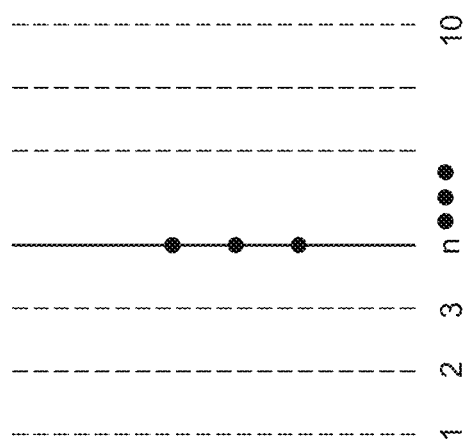
Figure 9A:
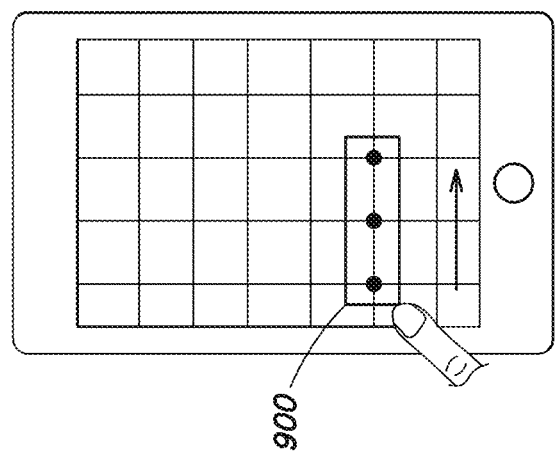

During an enrollment process such as shown in FIG. 9B the user may be prompted to swipe their finger along a set of enrollment "profile" lines presented on the display. In the example shown there are 10 such profile lines clustered within ±0.03 inches of the active swipe line. The enrollment lines may for example appear on the screen one by one with the user being prompted to swipe his finger along each respective enrollment line. In this way a data set for potentially different alignments between the finger and swipt line may be accommodated in the enrollment data. Then when the user later tries to access their device, one enrollment line centered on the active sensor line appears on the screen, and the detected data is correlated against the 10 profile lines.

9. Fingerprint Registration Using a Smartphone Touchscreen or Camera Image

The techniques described above use a single intersection on a grid-like touchscreen as the user swiped across the touchscreen to create a 1-D time varying signal representing the ridges and valleys of the fingerprint as the finger travels across the intersection in a straight line. This 1-D signal can be thought of as a "barcode" or barcode fingerprint. In the examples of FIGS. 2-3 and 2-4, this barcode was then compared to an actual full 2-D image of a user's fingerprint in order to discern whether there was a match or relevant correlation between the just-generated barcode and virtual, or synthetic, barcodes created from the stored actual fingerprint image.

One potential shortcoming with that approach is the need to capture, create, or download an image of the user's full fingerprint in order to have a construct against which to later compare barcode fingerprints generated from user swipes. As one purpose was to eliminate the full fingerprint sensor from a smartphone device, obtaining a full fingerprint, when the device did not have a fingerprint reader, sometimes meant the approach was at cross purposes.

A possible solution to this is to execute a calibration or setup routine whereby a user makes a multiplicity of swipes, generating a large number of 1-D barcodes. Alternatively, one or more of barcodes may be "stitched together" to create the equivalent of a full fingerprint, or enough of a full fingerprint in order to correctly match future barcode scans with the stored calibrated set. But this process can lack precision due to the difficulty in capturing enough calibration swipes, and enough different calibration swipes, to have a suitable basis for comparison later.

Alternatively, a multiplicity of calibration barcodes might be stored and then used for later correlations with user swipes, without need to try to construct a representation of the full fingerprint image. Again, however, this approach does not work well without the user providing a large number of calibration swipes something device users would not necessarily want to endure merely to allow the manufacturer to eliminate the fingerprint sensor.

Two approaches can be used to create a functional representation of, or an actual fingerprint image, which can then be registered as the reference against which subsequent data from user swipes can later be compared.

A. Fingerprint Representation Created from a Multiplicity of Intersections

Available smartphones as of the date of this filing now have touchscreen grids with 40 mils or less of spacing. It is therefore possible, with the advent of faster controller clock speeds in smartphone processors, to detect the time-varying 1-D signals generated at many intersections simultaneously to generate ridge and valley information as a user moves their finger over such a set of intersections. The outputs of this "sensing array" are then stitched together, and registered as the representational "image" of the user's finger to be used in the later matching process.

Figure 10:
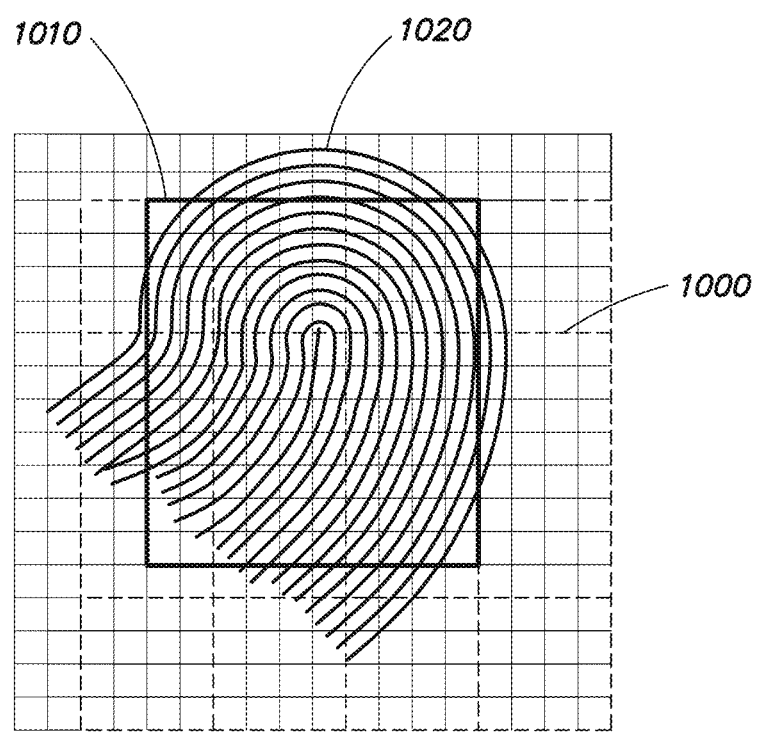
FIG. 10 illustrates a higher resolution touch sensitive array, and a selected sub-array near a finger.

In one example, shown in FIG. 10, an array of 12×12, or 144 intersections may be used. With a 40 mil spacing, an array of this size covers about a 480×480 mil (or ½ inch by ½ inch) portion of the finer. At normal finger swipe speeds, a sample rate of 15 kHz per intersection is determined to be sufficient to validly create each of the 1-D scans signals. Each 1-D signal is still a time-varying signal representative of the ridge and valley detail of the user's fingerprint as shown in FIG. 2-4. It would therefore take a 2.160 MHz sample rate to pick up the 144 signals generated by all such intersections. Controller clocks currently run at 3 MHz, so it should be possible to validly sample that many intersections on each pass. The required computing power to process the signals from the 144 intersection is estimated to be something less than 0.5 gigaflops, which is a small fraction of the average smart phone processing capability.

Note that the finger sensing sub-array could be selected to located within any portion of the touchscreen (as described in Section 1 above) since the device itself can detect the general area of the user's touch and then immediately set up the more precisae sensing array around such location. As the finger moves to different portions of the screen, the selected portion of the touchscreen used as the fingerprint sensing array could also move if needed by the application or use of such a swipe. For instance, a verification swipe used to unlock a phone might have to traverse the whole screen in order to prevent accidental unlocking.

Figure 11:
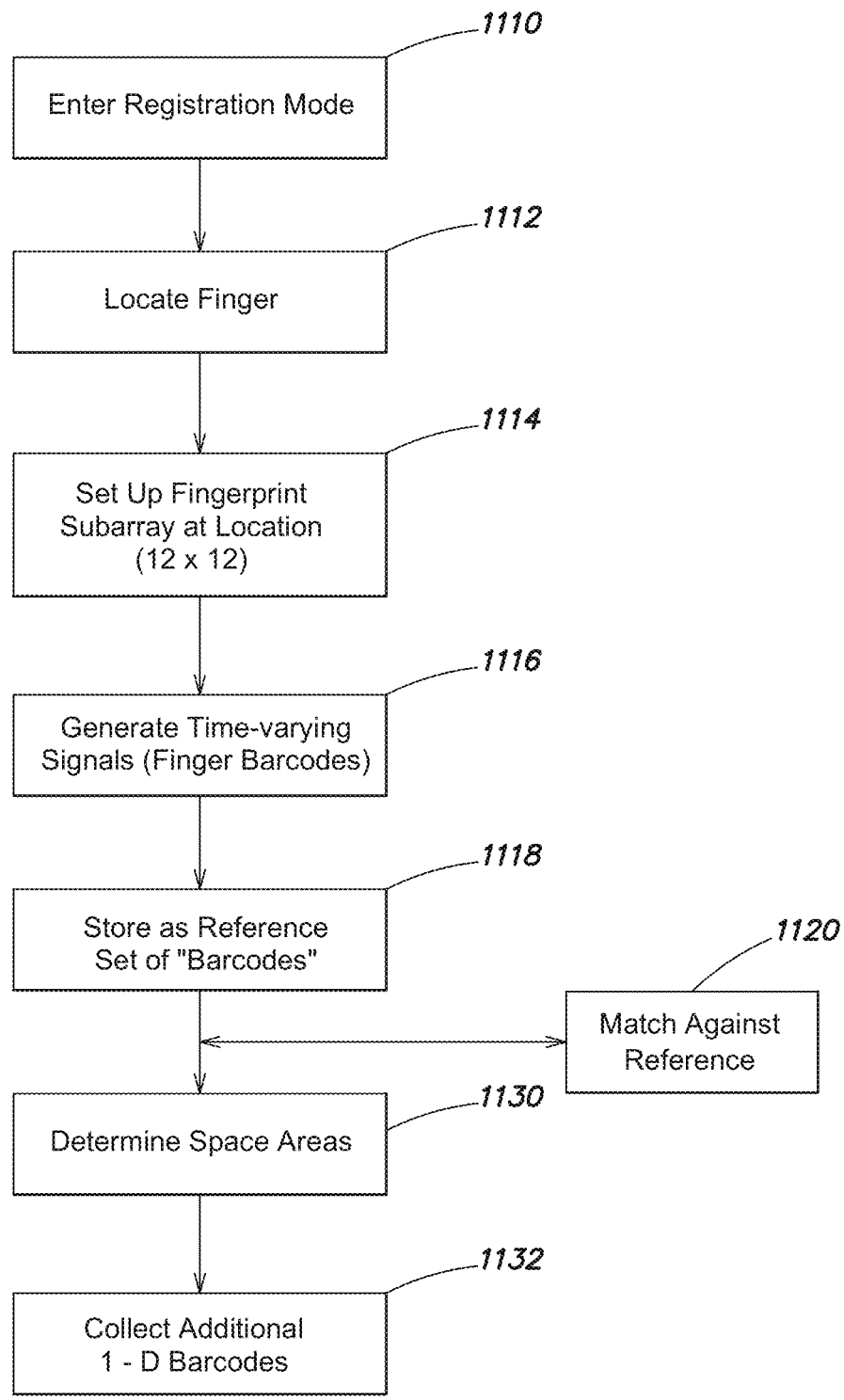
FIG. 11 is a logical flow for producing a set of fingerprint codes.

The purpose of the calibration or registration process in this sensing array embodiment would be to create a set of touch screen-generated fingerprint "barcodes" as a replacement for the previously required fingerprint image. As part of this process, shown in FIG. 11, the user would first be prompted at 1110 to place the finger to be identified anywhere on the screen. The system would then detect the location of the finger 1112 and set up 1114 the fingerprint sub-array in that area. The device then senses the outputs of the array 1116, during which the user might be asked to move the finger enough such that one or more ridges or valleys pass over a multiplicity of sensors located in the path of motion. As some sensors might have ridges and valleys running alongside of them and not over them, the user is preferably prompted to move their finger in a number of directions. This would maximize the ridge/valley information received by the sensors in the array.

As explained previously, each intersection generates a 1-D time varying signal as a fingerprint barcode. The 1-D signal generated by an intersection point will therefore be quite similar to, but translated or rotated based upon the direction of travel of the finger and its orientation, from the 1-D signal generated by an adjacent intersection point.

In one extreme, the finger need only move the distance between adjacent sensors, in the example described here that being 40 mils, to capture information concerning ridges and valleys not completely aligned with the direction of travel. The registration process therefore may consist of a user merely lightly rubbing the screen, thus permitting the 12×12 array to generate sufficient information from a variety of directions.

The resulting 1-D signals then become at step 1118 the registered reference set of "fingerprint barcodes". These barcodes are then used at a later time 1120 and matched when it is desired to authenticate a current user.

Alternatively, generation of the fingerprint barcodes at 1116 could be done with a set of simpler motions via one or more swipes in one direction. This will create a fingerprint skewed at some angle, dependent upon the direction of the swipe or swipes. The variation in swipe angle may be compensated for in the processing using the neuromorphic fast pattern recognizer (U.S. Pat. No. 8,401,297).

Corrections for variations in the velocity of the swipe explained above can also be applied.

Ir would be possible to improve the quality of the reference fingerprint over time by "learning" more about the fingerprint as the user used the smartphone. For instance, there might some incomplete or sparse areas in the reference fingerprint barcodes—but not so incomplete that some user swipes couldn't be associated with the user's reference fingerprint. In those cases, the array could collect data on the missing portions and add that new information, perhaps in a tentative fashion, to the unfilled portions of the reference fingerprint. Over time, such additions could be further verified. With learning processes such as these, user identification could become more assured and faster over time.

B. Creating an Optical Fingerprint Reference Using the Smartphone

An alternative to generating a set of reference fingerprint barcodes to which swipes could be compared, would be to use the phone's camera. Mobilephone cameras, such the ones in the recently released iPhone 11 have macro lenses with the capability to take high resolution pictures at close distances.

Figure 12:
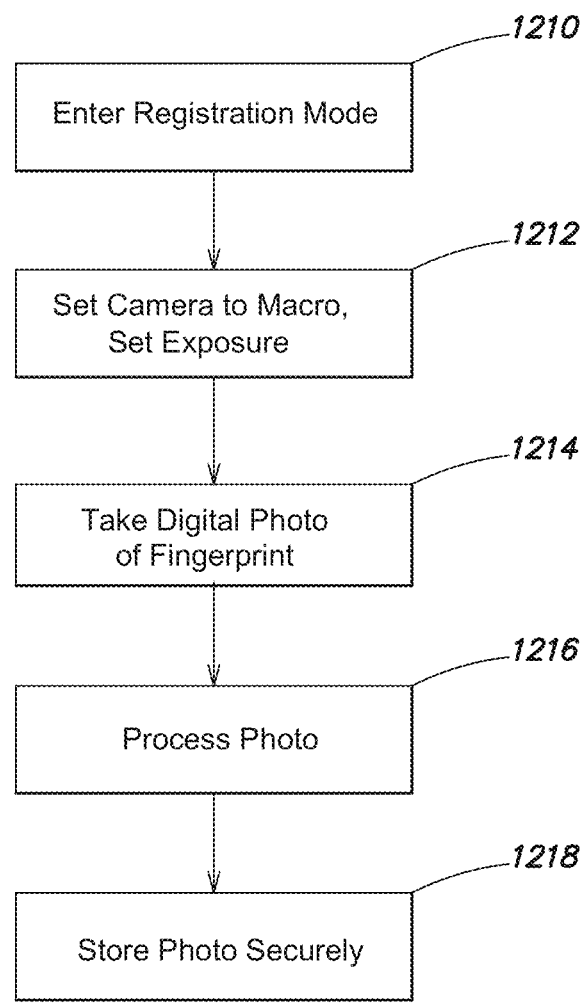
FIG. 12 is a logical flow for capturing a fingerprint image.

To create such an "actual optical image" as the reference fingerprint the user may execute an registration application. The flow of an example application is shown in FIG. 12. After starting the registration application at 1210, the user is prompted to take a photo of the finger of interest. The app would optimize the shoot to be used as a the eference fingerprint. The app would also put the camera in macro mode 1212 and set the exposure settings in such a way so as to optimize the clarity of the ridges and valleys. Such an app could then take a photo 1214. The captured photo may then at 1216 be converted to grayscale or resampled or otherwise processed as needed for use in later fingerprint matching. Any step of storing 1218 the photo would preferably preserve the privacy of the user by not storing such photo in the photo gallery, but only in a file accessible to the fingerprint recognition applications (which may even be stored in encrypted form).

Many smartphones now have cameras with distance sensing. This distance information may be used in the processing step 1216 to ascertain how far away the finger was being held from the camera, and thus permitting the image to be scaled appropriately. Furthermore, the sensed distance information, or image analysis software, may also determine if the finger was being held at an angle with respect to the camera. If it were, compensating parallax adjustments may be made to the image to make it appear as it might have had it been held at a correct angle facing the camera.

What is claimed is:

1. A method for using a touchscreen to verify a user of a device is an authorized user, comprising:

registering information representative of a person's fingerprint by in a first mode, displaying a prompt to interact with the touchscreen, scanning touch sensor outputs from the touchscreen, the touchscreen having a touch sensor array comprising a capacitive wire grid, the scanning occurring at a first rate to provide outputs from the array sufficient to detect a position of a finger on the touchscreen, in a second mode, scanning the touch sensor array at a second rate higher than the first rate, the second rate sufficient to provide outputs at each of a plurality of grid intersection points of the array, each touch sensor output comprising a time-varying one-dimensional sequence of digital amplitude values that, over time, are representative of a ridges and valleys detail of a rectangular portion of a fingerprint terrain as the finger passes adjacent to a corresponding one of the grid intersection points in response to the prompt to interact with the touchscreen, periodically switching between the first mode and the second mode;

using the position of the finger detected in the first mode to determine when to switch to the second mode;

in the second mode, further sampling a sub-array of the touch sensor outputs over time and at array locations limited to those adjacent the position of the finger detected in the first mode, to detect ridges and valleys of the user's fingerprint terrain as the user's finger moves with respect to the wire grid thus providing a first set of one-dimensional time-varying user profile signals;

storing the first set of user profile signals;

at a later time, sampling the touch sensor outputs over time, to detect ridges and valleys of the user's fingerprint terrain as the user's finger moves with respect to the wire grid thus providing a second set of one-dimensional time-varying signals representative of the user's fingerprint;

determining if the user is an authorized user by comparing the first and second set of one-dimensional time varying signals.

2. A method for verifying a user of a device is an authorized user, comprising:

in a first mode, registering information representative of a person's fingerprint by capturing a digital image of the user's fingerprint from a camera associated with the device; and storing the digital image;

in a second mode, displaying a prompt to interact with a touchscreen within the device, the touchscreen having a touch sensor array comprising a capacitive wire grid, scanning the touch sensor array at each of a plurality of grid intersection points over time, each touch sensor providing a time-varying one-dimensional signal output that is representative of ridges and valleys detail of a fingerprint terrain of a user as the user's finger moves with respect to the grid intersection point in response to a prompt to interact with the touchscreen;

the scanning further sampling a sub-array of the touch sensor outputs over time, as the user's finger moves with respect to the wire grid thus providing a set of one-dimensional time-varying signals; and determining if the user is an authorized user by comparing the digital image and the set of one-dimensional time varying signals.

3. The method of claim 1 wherein the sequence of digital amplitude values, over time, is further representative of a direction along which the person's finger moves with respect to the corresponding touchscreen array element.

4. The method of claim 1 wherein the sequence of digital amplitude values, over time, is representative of a velocity at which the person's finger moves with respect to the corresponding touchscreen array element.

5. The method of claim 1 wherein the sequence of digital amplitude values is further normalized with respect to the velocity at which the finger moves with respect to the corresponding touchscreen array element.

6. The method of claim 1 wherein comparing the first and second set of one-dimensional time-varying signals additionally comprises:

rotating and/or translating a position of at least one of the sequence of digital values relative to another sequence of digital values.

7. The method of claim 1 further comprising:

normalizing the sequence of digital values by a time scale factor that depends on a velocity at which the finger moves with respect to the corresponding touchscreen array element.

8. The method of claim 1 additionally comprising:

detecting a touchscreen gesture from the same one or more of the one-dimensional time-varying signals used in the comparing.

9. The method of claim 1 wherein the prompt further requests a user to interact with the touchscreen by moving the finger in multiple directions.

* * * * *